May 28, 1929.  H. T. MATHIESON  1,715,141
CONVEYER
Filed Aug. 31, 1926
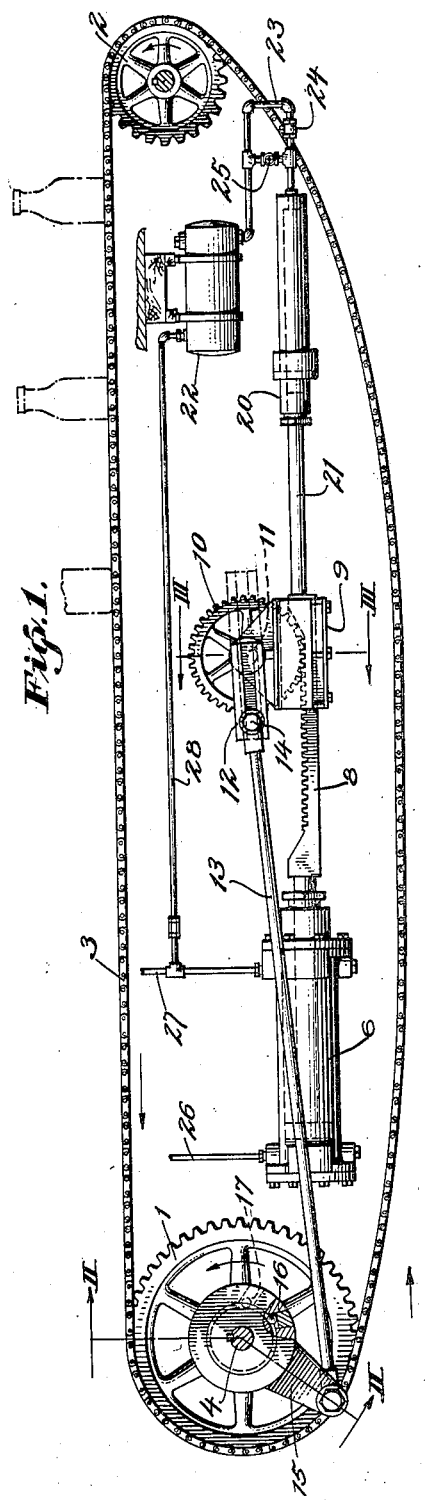
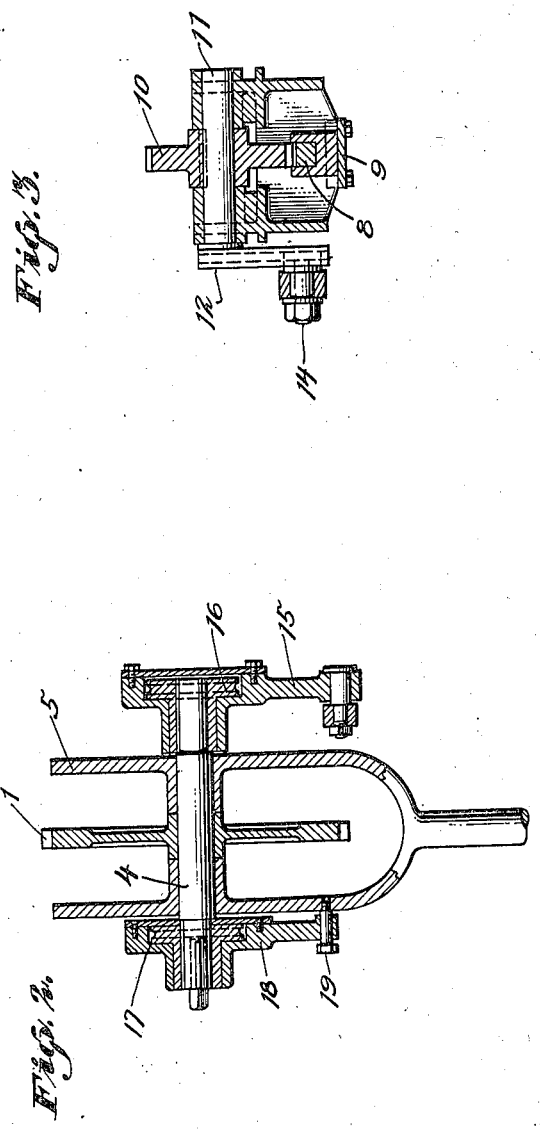
INVENTOR.
Holger T. Mathieson
BY
Townsend, Loftus & Affett
ATTORNEYS.

Patented May 28, 1929.

1,715,141

UNITED STATES PATENT OFFICE.

HOLGER T. MATHIESON, OF SAN FRANCISCO, CALIFORNIA, ASSIGNOR TO ILLINOIS PACIFIC GLASS CORPORATION, OF SAN FRANCISCO, CALIFORNIA, A CORPORATION OF DELAWARE.

CONVEYER.

Application filed August 31, 1926. Serial No. 132,730.

This invention relates to an intermittent conveyer of the endless type having a driving mechanism arranged to operate the conveyer with very little jar or vibration, thereby particularly adapting the conveyer to carry glassware such as bottles in the upright position. My improved conveyer herein has a driving mechanism which moves the conveyer intermittently and is so arranged that the conveyer is moved very slowly at the starting and stopping thereof, but is moved very quickly between the starting and stopping. One object of my invention is to provide an improved conveyer having such a driving mechanism.

In conveying fragile articles such as glassware, it is also desirable that the conveyer should operate with great smoothness and furthermore it is desirable to accurately control the speed of the conveyer and operate the same uniformly. My invention contemplates an oil cushioning mechanism so combined with the conveyer driving mechanism that the same cushions the driving strokes, controls the same to a uniform speed and can be regulated to accurately control the speed of operation thereof. It is a further object of my invention to provide an improved driving mechanism of this type.

In the accompanying drawing I have illustrated one specific embodiment of my invention, but it will be understood that the invention can be otherwise embodied and that the drawing is not to be understood as defining or limiting the scope of the invention, the claims appended hereto being relied upon for that purpose.

Referring to the figures of the drawing:

Fig. 1 is a fragmentary side elevation of a conveyer mechanism illustrating my invention.

Fig. 2 is a sectional view taken on line II—II of Fig. 1.

Fig. 3 is a sectional view taken on line III—III of Fig. 1.

In the drawing, 1 and 2 indicate a pair of rotary supports on which is mounted an endless conveyer member 3 which may be of belt or chain construction. The member 1 is mounted on a shaft 4 in a supporting yoke 5. The driving mechanism for the conveyer comprises a cylinder 6 having a piston 7 operating therein and connected to a rack 8 slidable in a housing 9, and in mesh with a gear 10. The gear 10 is mounted on a shaft 11 carrying an arm 12. One end of a connecting rod 13 is carried on a crank pin 14 adjustable radially in a slot in this arm. The other end of the rod is connected to the free end of an arm 15 loosely mounted on one end of the shaft 4. A one way ball clutch 16 is provided between the arm 15 and shaft 4 whereby the rod operates to drive the member 1 only in the direction indicated by the arrow. The member 1 and shaft 4 are prevented from rotating in the opposite direction by a one way ball clutch 17 within a member 18 secured against rotation by a pin 19.

An oil cylinder 20 is preferably mounted in a position opposite the cylinder 6 and a plunger 21 extending into one end of the cylinder 20 is preferably directly connected to the rack 8. A pressure tank 22 is connected by a pipe 23 to the other end of the cylinder 20. A check valve 24 in this pipe permits flow of oil therethrough only in a direction toward the cylinder. The flow of oil from the cylinder in the other direction is controlled by an adjustable valve 25.

The piston 7 in cylinder 6 is preferably operated by air. Air pipes 26 and 27 extend into the opposite ends of this cylinder, air from the pipe 26 operating the piston in the working direction and air from the pipe 27 operating the piston in the idle stroke direction.

A pipe 28 connects the pipe 27 to the top of the pressure tank 22.

The operation of the mechanism disclosed is substantially as follows:

Air pressure being alternately provided to the pipes 26 and 27 in the well known manner serves to drive the piston 7 back and forth. When the piston moves to the right under pressure from the pipe 26, the crank arm 12 is moved from the full line position to the broken line position and the conveyer member 1 is rotated in the direction of the arrow. When the air pressure is directed to the pipe 27, the piston moves in the opposite direction, and, due to the ball clutch connection 16, the arm 15 rotates idly while the member 1 is held from rotation therewith by the ball clutch 17. It will be seen that the crank arm 12 is oscillated 180° and is at the dead center of power at both ends of such movement. By this arrangement, the starting and stopping of the conveyer is accomplished very slowly, while the intermediate movement thereof is relatively rapid. Such arrangement particularly adapts the conveyer to carry fragile articles such as the bottles illustrated.

In addition to the mechanism, operation of which has just been described, it is also desirable to control the speed of operation and also make the same uniform and smooth. The oil cylinder 20 and its co-operating mechanism serves this purpose. The oil under pressure in the tank 22 runs through the connection 23 and valves 24 and 25 to fill the cylinder 20 as the rack 8 withdraws the plunger 21 from the cylinder, this being the idle stroke of the driving mechanism. When the mechanism operates in the opposite direction, this oil is forced back to the tank 22. No oil can pass in this direction through the check valve 24 and all the oil must therefore pass through the valve 25. This valve, which can be adjusted as desired, therefore controls the speed of the driving mechanism. Furthermore, the oil cylinder acts as a buffer and causes the mechanism to run with great smoothness and uniformity.

It will be noted that the air pressure to the tank 22 is obtained from the pipe 27 through the pipe 28. Air pressure to drive the oil from the tank 22 into the cylinder 20 is therefore provided to the tank 22 only during the idle stroke of the mechanism and while the plunger 21 is being withdrawn from the cylinder 20.

Having thus described my invention, what I claim and desire to secure by Letters Patent is:

1. An intermittent conveyer of the endless type, comprising the combination of a pair of rotary supports, an endless conveyer member extending around the supports, a cylinder, a fluid operated piston in the cylinder, fluid pressure connections to the opposite ends of the cylinder, a driving connection between the piston and one rotary support, a one-way clutch in the driving mechanism whereby movement of the piston imparts movement to the conveyer in one direction only, an oil cylinder, a pressure tank, means providing a port from the pressure tank to the oil cylinder, a plunger reciprocated by the piston and extending into the oil cylinder, and means providing a port from the fluid pressure connection, which drives the piston on its idle stroke, to the pressure tank, the last said means being adapted to force oil from the pressure tank into the oil cylinder during the idle stroke of the conveyer driving mechanism.

2. An intermittent conveyer of the endless type, comprising the combination of a pair of rotary supports, an endless conveyer member extending around the supports, a cylinder, a fluid operated piston in the cylinder, fluid pressure connections to the opposite ends of the cylinder, a driving connection between the piston and one rotary support, a one-way clutch in the driving mechanism whereby movement of the piston imparts movement to the conveyer in one direction only, an oil cylinder, a pressure tank, means providing a port from the pressure tank to the oil cylinder, a plunger reciprocated by the piston and extending into the oil cylinder, means providing a port from the fluid pressure connection, which drives the piston on its idle stroke, to the pressure tank, the last said means being adapted to force oil from the pressure tank into the oil cylinder during the idle stroke of the conveyer driving mechanism, a check valve in the port between the oil cylinder and pressure tank and permitting a flow of oil therethrough only toward the cylinder, and an adjustable valve connection between the oil cylinder and pressure tank and adapted to vary the flow of oil from the cylinder in a manner varying the speed of the conveyer.

HOLGER T. MATHIESON.